(No Model.) 7 Sheets—Sheet 2.
J. PFEIFER.
CASH REGISTER AND INDICATOR.
No. 560,924. Patented May 26, 1896.
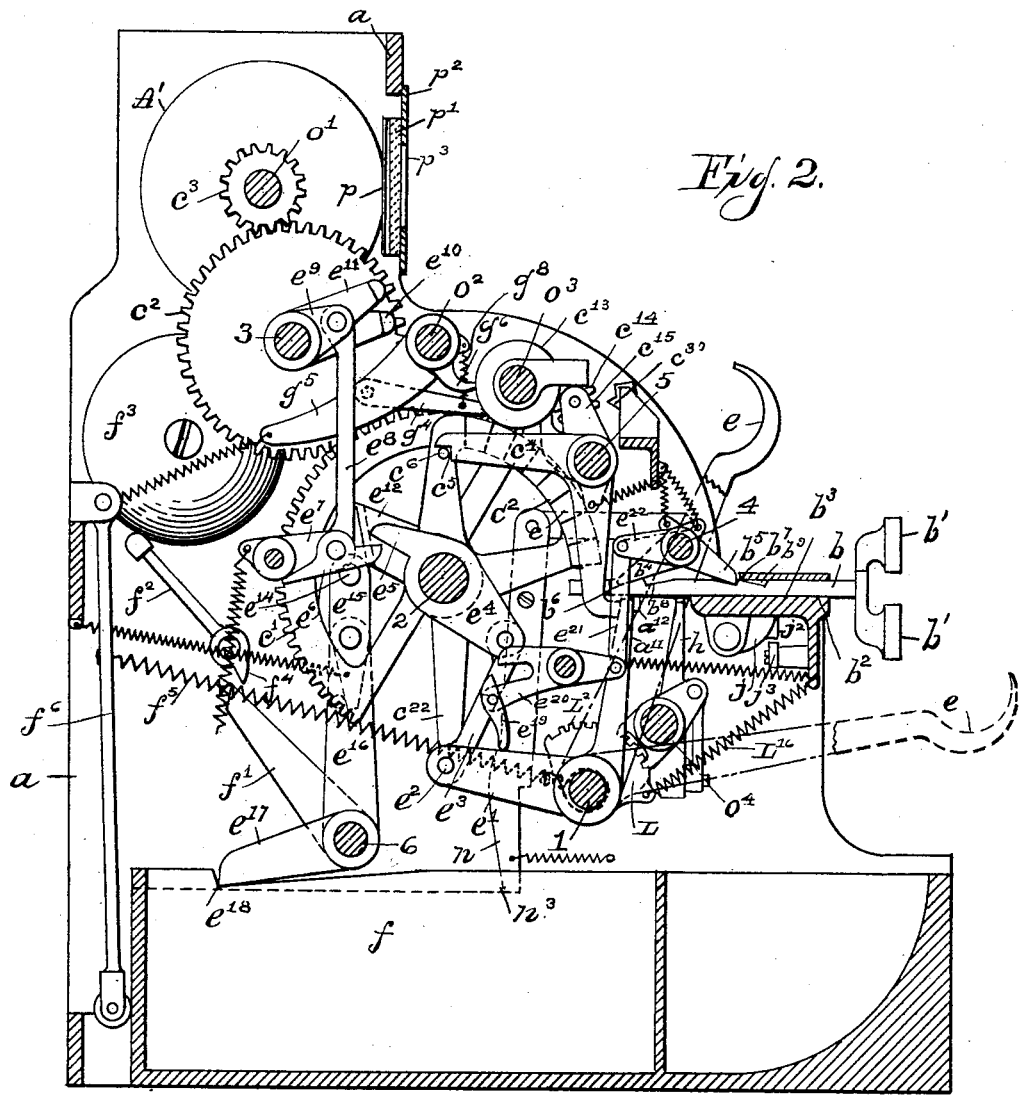
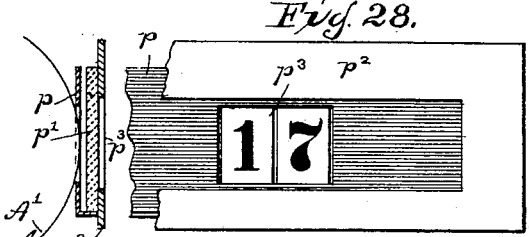
WITNESSES:
G. M. Gridley
Geo Bohnenkemper
INVENTOR
John Pfeifer
BY
Paul A. Staley
ATTORNEY (No Model.) 7 Sheets—Sheet 3.
J. PFEIFER.
CASH REGISTER AND INDICATOR.
No. 560,924. Patented May 26, 1896.

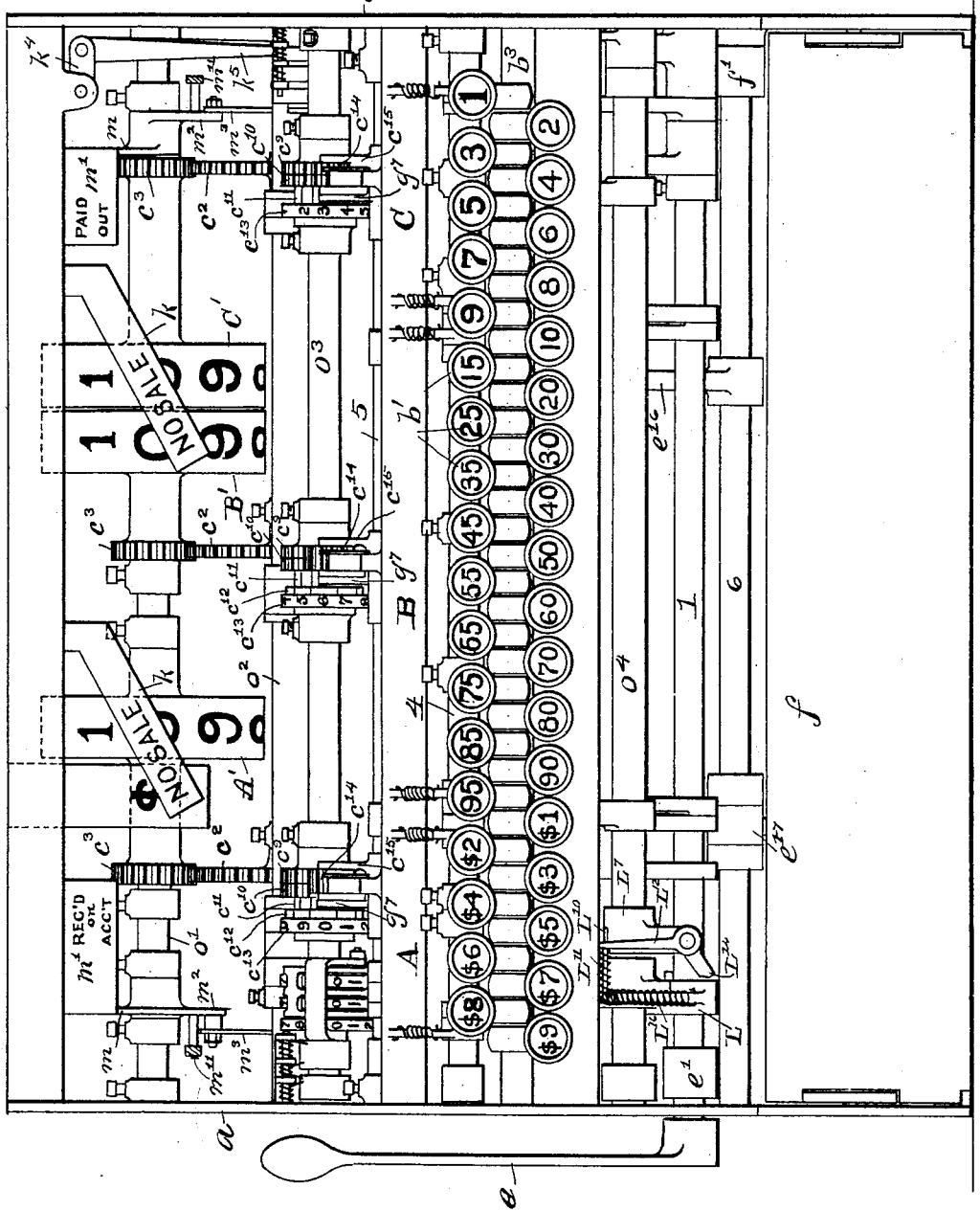

WITNESSES:
G. M. Gridley
Geo. Bohnenkemper

INVENTOR
John Pfeifer
BY
[signature]
ATTORNEY

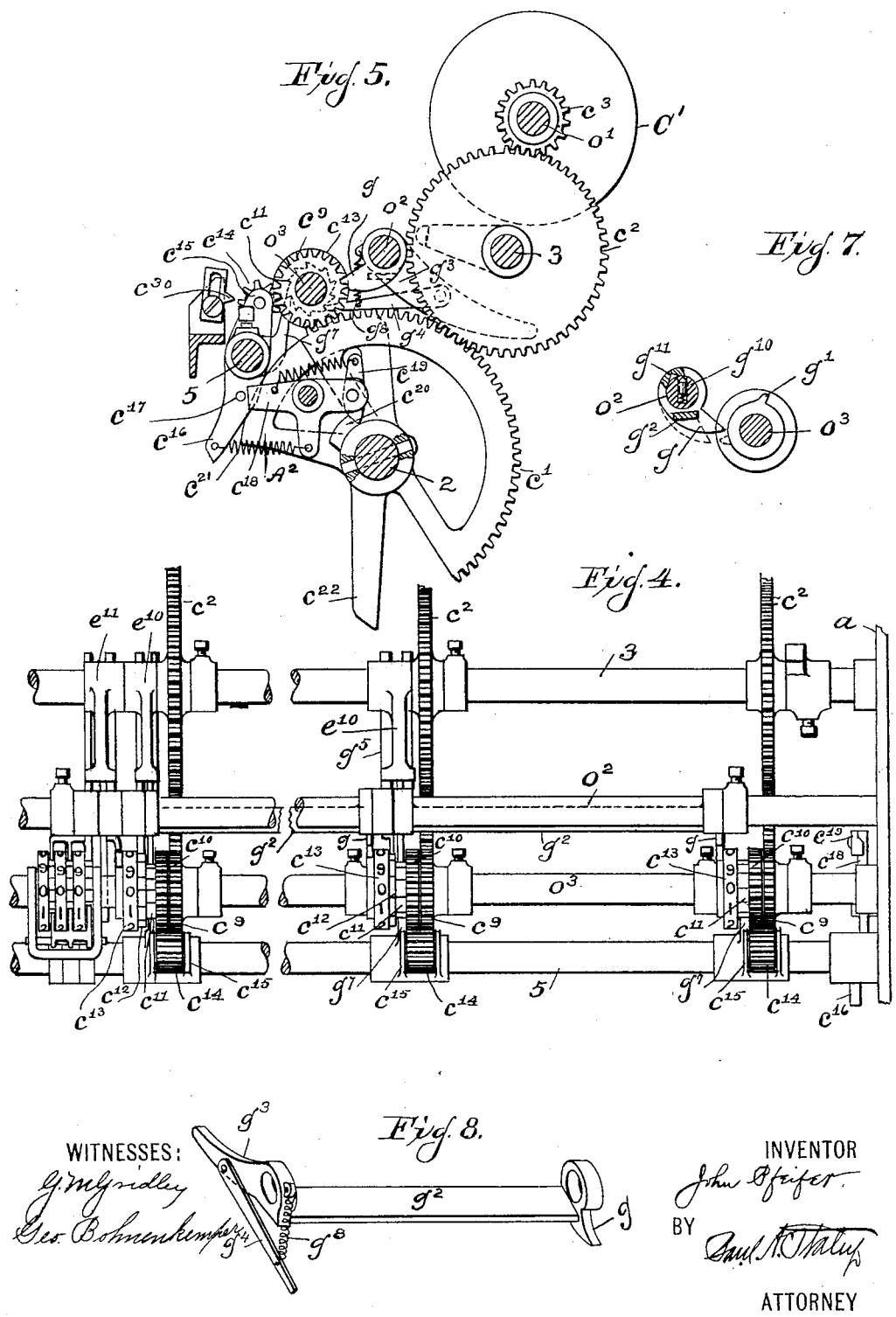

(No Model.)
7 Sheets—Sheet 5.

J. PFEIFER.
CASH REGISTER AND INDICATOR.

No. 560,924.
Patented May 26, 1896.

WITNESSES:
G. M. Gridley
Geo. Bohmenkemper

INVENTOR
John Pfeifer
BY
Paul N. Fahey
ATTORNEY (No Model.) 7 Sheets—Sheet 6.
J. PFEIFER.
CASH REGISTER AND INDICATOR.
No. 560,924. Patented May 26, 1896.
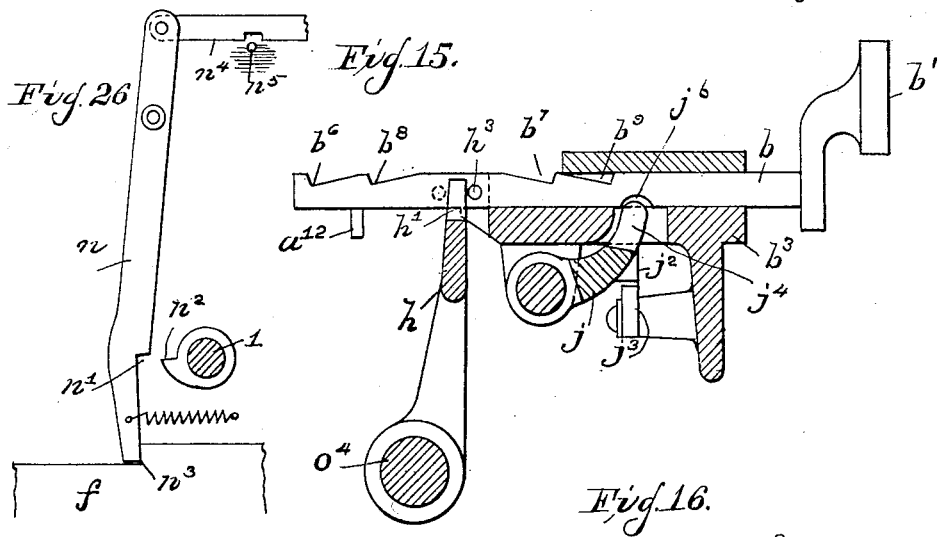
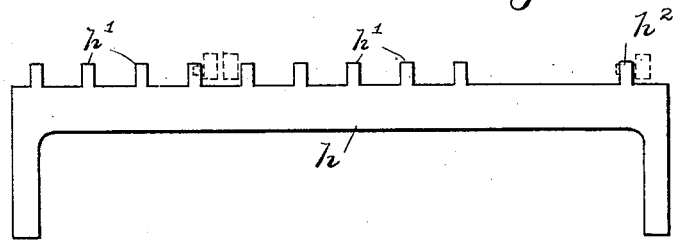
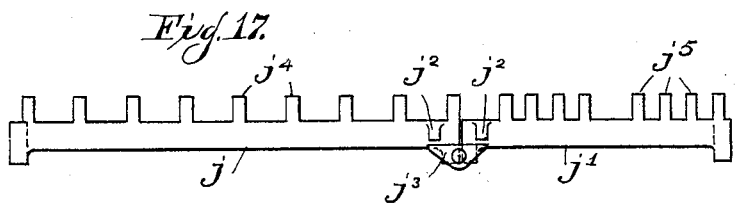
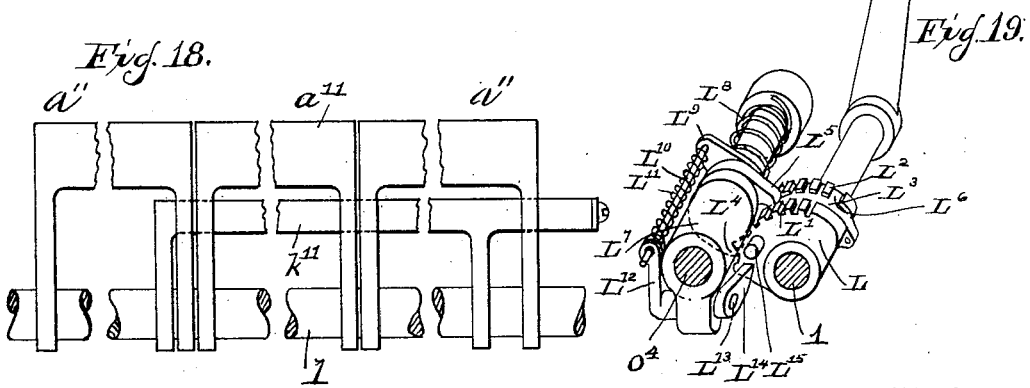
WITNESSES:
G. M. Gridley
George Bohnenkemper
INVENTOR
John Pfeifer
BY
Paul A. Staley
ATTORNEY (No Model.) 7 Sheets—Sheet 7.
J. PFEIFER.
CASH REGISTER AND INDICATOR.
No. 560,924. Patented May 26, 1896.
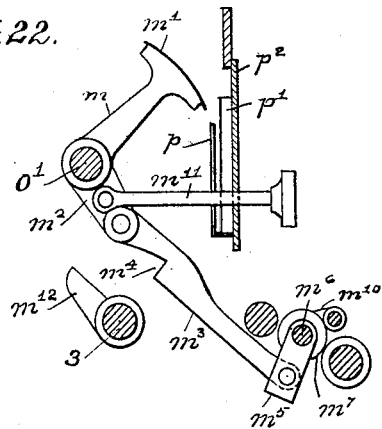
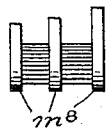
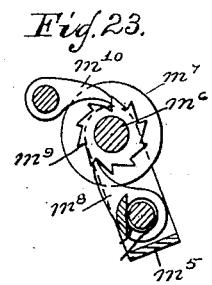
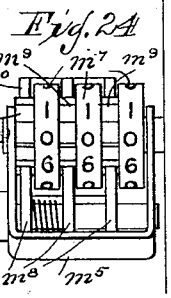
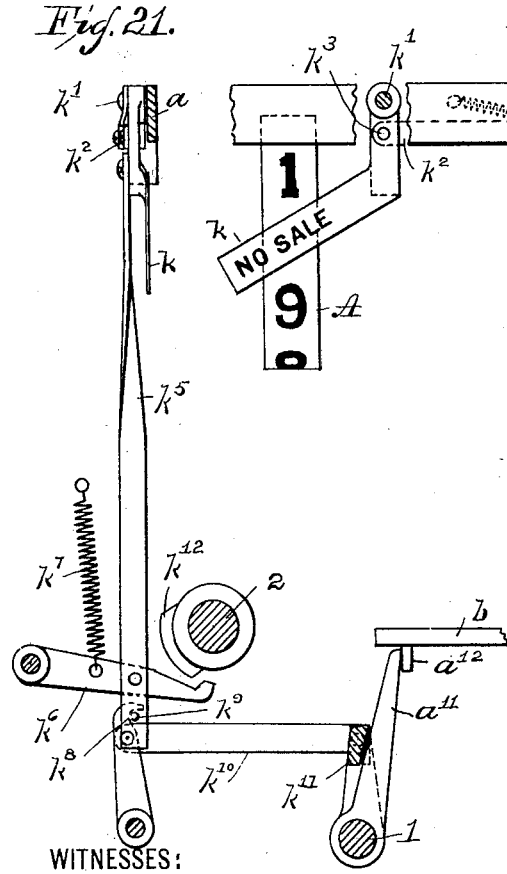
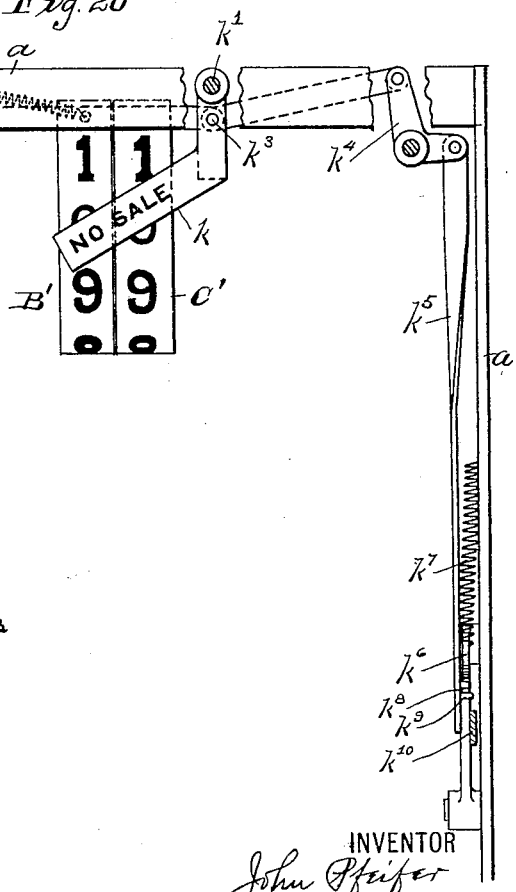
WITNESSES:
G. M. Gridley
Geo. Bohnenkemper
INVENTOR
John Pfeifer
BY
[signature]
ATTORNEY

UNITED STATES PATENT OFFICE.

JOHN PFEIFER, OF SPRINGFIELD, OHIO, ASSIGNOR OF ONE-HALF TO WM. F. BAUROTH AND EMIL BAUROTH, OF SAME PLACE.

CASH REGISTER AND INDICATOR.

SPECIFICATION forming part of Letters Patent No. 560,924, dated May 26, 1896.

Application filed February 25, 1895. Serial No. 539,700. (No model.)

*To all whom it may concern:*

Be it known that I, JOHN PFEIFER, a citizen of the United States, residing at Springfield, in the county of Clark and State of Ohio, have invented certain new and useful Improvements in Cash Registers and Indicators, of which the following is a specification.

My invention relates to improvements in cash registers and indicators; and it consists in the various constructions and combinations of parts hereinafter described, and set forth in the claims.

Figure 3:
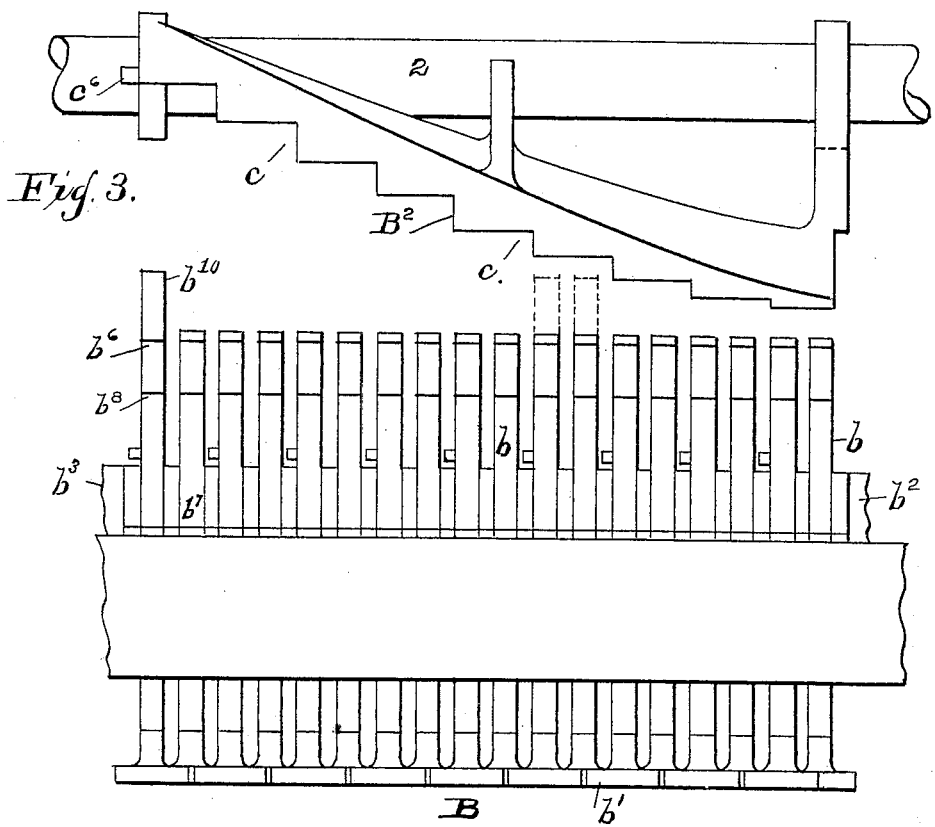
Figure 6:
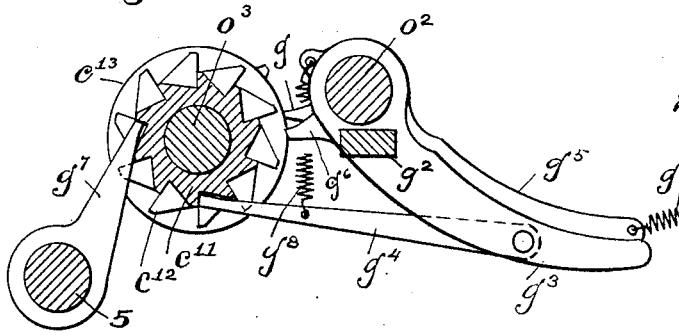
Figure 26:
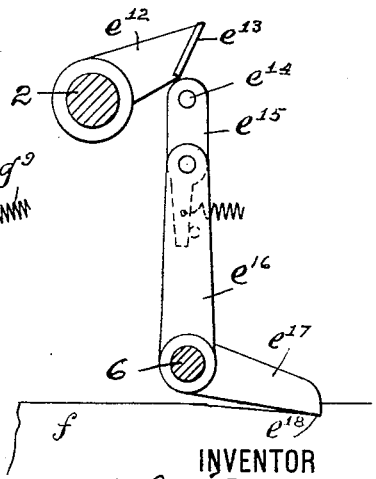
Figure 9:
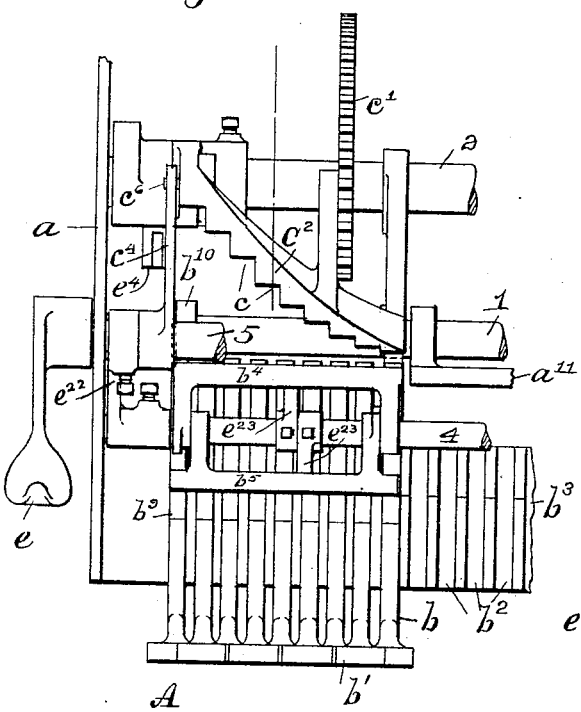
Figure 13:
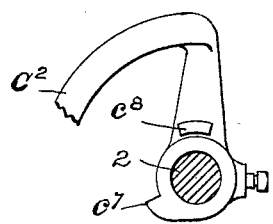
Figures 11, 12:
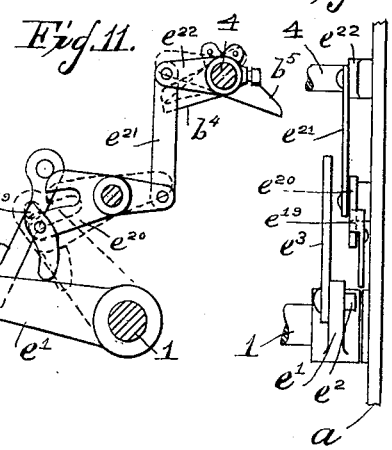
Figures 10, 14:
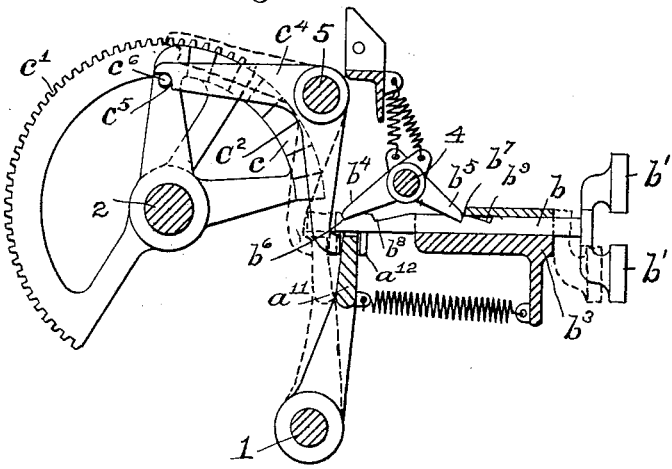

In the accompanying drawings, Figure 1 is a front elevation of a machine embodying my invention. Fig. 2 is a transverse sectional elevation of the same, the section being taken near one end of the main frame. Fig. 3 is a plan view of a portion of the registering mechanism. Fig. 4 is a plan view of other portions of the registering mechanism. Fig. 5 is a sectional elevation of the same. Figs. 6, 7, and 8 are detail views of portions of the same. Fig. 9 is a detail view in the nature of a plan, showing part of the keyboard and the devices for locking the keys. Figs. 10 to 14, inclusive, are detail views of portions of the same. Figs. 15 to 18, inclusive, are detail views of devices connected with the keys, by means of which certain keys in different banks or series are connected to other keys of adjacent series. Fig. 19 is a detail view in perspective of an arresting device for the operating mechanism. Figs. 20 and 21 are detail views of a canceling device connected with the indicators. Figs. 22 to 25, inclusive, are details of a registering device for registering transactions of a special character. Fig. 26 is a detail view of a locking device for the operating mechanism. Figs. 27 and 28 are details of the indicating devices.

In the said drawings, $a\ a$ represent a main frame, in which all the operative parts are supported. This frame, with its operative mechanism, is, when in operation, inclosed in a suitable casing in the usual way, this casing being omitted in all the views. The operating-keys are arranged at the front of the machine, preferably in a horizontal position, as shown, though they may be arranged at any suitable angle, as desired. These keys are divided into different banks or series, as represented at A, B, and C, each bank or series representing different denominations, such as dollars, dimes, and cents. For each bank or series there is an indicating-wheel $A'$, $B'$, and $C'$, arranged at the top of the casing and connected to the operating devices in such a manner that when a key is depressed in any of the banks or series its indicating-wheel will turn to the number corresponding to said key, as will more fully appear hereinafter, the indicating-wheels being arranged to expose the numbers through a suitable aperture at the top of the casing for this purpose and in such a manner that they will read in proper numerical order one with the other to indicate the denominations of the banks or series of keys.

The operating parts of the machine are nearly all supported on a series of rods and shafts, which extend entirely through the machine. Those numbered from 1 to 6, in addition to their function of supporting various parts of the mechanism, are partially revolved or oscillated to perform additional functions constituting part of the operation. Those marked $o'\ o^2\ o^3\ o^4$ are stationary rods, extending from side to side of the machine and supporting some of the various parts.

Each of the keys consists of a bar $b$, preferably square in cross-section and provided at its outer end with a head $b'$, which is preferably projected in a plane at right angles to that of the bar $b$, the head of each alternate key being projected in a different direction, so that while the keys stand in the same horizontal plane the key-heads are arranged in two horizontal rows. These heads are provided in the usual manner with numbers indicative of the value of the key. Each of the key-bars $b$ rests in a suitable bearing $b^2$ in a horizontal plate or bar $b^3$, which extends entirely across the frame near the front and supports all the keys.

Extending across each bank of keys are two hinged vibrating plates $b^4\ b^5$, each of which is hinged on the shaft 4 and rests normally in a notch in the key-bar, the plates $b^4$ being on one side of the shaft 4 and resting in the notches $b^6$ in the keys, while the plates $b^5$ are arranged on the opposite side of the shaft 4 and rest in notches $b^7$ in said keybar. The keys are thus normally held against longitudinal movement in either direction.

Means are provided by which these plates $b^4$ $b^5$ may be vibrated alternately, so as to raise them from the notches in the key-bars. When the plate $b^5$ is so raised, any key in that series may be pushed inwardly, and when so operated the plate $b^4$ will engage a second notch $b^8$ in the key-bar and retain it in this position, a third or auxiliary notch $b^9$ being also provided in the proper position to receive the plate $b^5$, which is thus permitted to return to its normal position while the key is in an abnormal position.

Immediately back of the keys and supported on the main shaft 2 is a series of graduated segmental bars $A^2$ $B^2$ $C^2$, one for each bank of keys. These graduated segmental bars are provided with steps $c$, and are pivoted on the main shaft 2 in such a manner that when released they will turn on said shaft, so that these successive steps will engage with the respective keys when the keys are pushed inwardly. Each bank contains nine keys and each segmental bar contains nine steps. The ninth key of each series, however, is made longer, as shown at $b^{10}$, so as to always engage the segmental bar when the same is released, whether compressed inwardly or not, the other keys in their normal positions being adapted to permit the segmental bar to pass by the same when in the normal position. Each segmental bar has a gear-segment $c'$, which is in mesh at all times with an intermediate gear $c^2$, which in turn meshes with a pinion $c^3$ on one of the indicating-wheels, the indicating-wheels being adapted to turn loosely on the rod $o'$. The indicating-wheels thus always indicate the position of the segmental bars. These wheels contain numbers corresponding to the numbers on the keys, and each stands normally at zero. If the segmental bar is permitted to move a distance equal to one step, the figure "1" is displayed on the indicator. If it moves nine steps, figure "9" is displayed, any intermediate step being indicated by the intermediate number belonging thereto. The segmental bars are normally held in position by bell-crank levers $c^4$, which are pivoted on the shaft 5. Each of these bell-crank levers is provided on one arm with a shoulder $c^5$, which engages with a pin or projection $c^6$ at one end of the segmental bar. The other end of each of these bell-crank levers rests in contact with a swinging plate $a^{11}$, which is pivoted on the frame-shaft 1 and normally rests in contact with a projection $a^{12}$ on each key-bar of the series to which it belongs, there being one of these swinging plates for each bank of keys. Whenever a key is pressed inwardly, it moves this vibrating plate, which in turn moves the bell-crank lever $c^4$, so as to disengage the graduated segmental bar and permit it to turn on the main shaft until it contacts with the key-bar which has been depressed. In the normal position the segmental bars are held from turning on the main shaft 2 by projections $c^7$, formed on or secured to said shaft, which rest against lugs or projections $c^8$ on each of the segmental bars. (See Fig. 13 for detail.) Before a key can be pressed inwardly these projections $c^7$ are, by the movement of the shaft 2, turned away from the projections $c^8$ to permit the segmental bars to drop when released by their bell-cranks. The turning of the shaft 2 in the opposite direction, so as to bring the projections $c^7$ and $c^8$ into contact, serves to return all the segmental bars to their normal positions, as will hereinafter more fully appear. Each gear-segment $c'$ also engages with a small gear wheel or pinion $c^9$ on the frame-rod $o^3$, which lies at the side of and in close proximity to a duplicate gear $c^{10}$, to which on one side is connected ratchet-wheels $c^{11}$ and $c^{12}$, each having a number of teeth corresponding to the teeth in the wheel, but beveled from opposite sides. This gear $c^{10}$ also has connected thereto a registering-wheel $c^{13}$, having numbers on its periphery corresponding to the number of teeth in the gears and in the respective ratchet-wheels. In proximity to the duplicate gears $c^9$ and $c^{10}$ is a pinion $c^{14}$ of the same pitch as said duplicate gears and of a face sufficiently long to extend across the faces of both of said gears, with which it is adapted to mesh under certain conditions. Each of these pinions is journaled in the end of a bifurcated arm $c^{15}$, which is secured to the frame-shaft 5 in such a manner that by a partial revolution of said shaft the pinion may be brought into gear or disengaged from the duplicate gears $c^9$ $c^{10}$, and thus cause them to turn together by the movement of the gear-segment $c'$. When the pinion $c^{14}$ is disengaged from said gears, however, the gears $c^9$ will revolve, while the gear $c^{10}$ remains at rest. Means are provided for engaging the pinion $c^{14}$ with the duplicate gears $c^9$ $c^{10}$ when the segmental bars are disengaged, so that when said bars move to contact with the keys the registering-gear $c^{10}$ is also moved. Prior to the time that the segmental bars are returned to their normal positions, however, the pinion $c^{14}$ is disengaged from said duplicate gears and the registering-wheel remains at rest. This is accomplished as follows: The shaft 5 has at or near one end an arm $c^{16}$, having thereon a lateral projection $c^{17}$, which normally contacts with a pivoted lever $c^{18}$, pivoted to the end of the frame. This lever $c^{18}$ has at its other end a pivoted spring-actuated pawl $c^{19}$, which normally contacts with a projection $c^{20}$, formed on or secured to the main shaft 2. This pawl $c^{19}$ may turn on its pivot in one direction only, so that as the shaft revolves it turns the lever $c^{18}$ on its pivot. The lever $c^{18}$ and the arm $c^{16}$ are connected together by a spring $c^{21}$, so that the moment the lever $c^{18}$ is moved away from the projection $c^{17}$ the arm $c^{16}$ is drawn toward the lever $c^{18}$ with the projection $c^{17}$ above said lever, the parts being thus locked in this position. The movement of the arm $c^{16}$ causes the shaft 5 to partially revolve, so as to withdraw the pinion $c^{14}$ from mesh with the duplicate gears. It will be remembered that the main shaft 2 must be moved before the segmental bars can be disengaged. Hence the movement which is described takes place prior to the time that the segmental bars are released, and during this time the transferring of amounts from one denomination-wheel to another takes place, as will hereinafter more fully appear. As the shaft 2 continues in its movement, a projecting finger $c^{22}$, connected to said shaft, comes in contact with the end of the arm $c^{16}$ and forces it outwardly until the projection $c^{17}$ passes the end of the lever $c^{18}$. The spring $c^{21}$ is at the same time put under tension, which turns the lever $c^{18}$ on its pivot, so as to reëngage the arm $c^{16}$, thus reëngaging the pinion $c^{14}$ with the duplicate gears. These movements are all produced by means of a lever $e$ at one end of the frame and projecting beyond the casing, the operation of which will now be described. This lever $e$ is secured rigidly on the end of the shaft 1 and when operated moves in the arc of a circle from thirty to forty-five degrees. An arm $e'$ on this lever-shaft 1 has at its outer end a lateral projection $e^2$, and has also pivoted thereto a link $e^3$, the opposite end of which is pivoted to an arm $e^4$, secured to the main shaft 2. This arm $e^4$ has a finger $e^5$ projecting therefrom on the opposite side of the center of said shaft, adapted to contact with a pivoted pawl $e^6$ on the end of an arm $e^7$, which is pivoted to the frame and is connected by a link $e^8$ to a projecting arm $e^9$ on the shaft 3, on which the intermediate gears $c^2$ are journaled. This shaft 3 has projecting therefrom, in proximity to each of the intermediate gears $c^2$, two arms $e^{10}$ $e^{11}$, which turn with said shaft to operate the transferring device, as is hereinafter more fully described. There is also secured to the main shaft 2 an arm $e^{12}$, which has at its outer end a laterally-projecting flange $e^{13}$ arranged at an angle on said arm. As the shaft 2 moves this flange $e^{13}$ is adapted to contact with a lateral projection $e^{14}$ on a pivoted pawl $e^{15}$, which is pivoted to an arm $e^{16}$ on the shaft 6. This shaft 6 has also secured thereon a dog $e^{17}$, which normally engages with a notch $e^{18}$ in the cash-drawer $f$. As the shaft 2 returns to its normal position the flange $e^{13}$ engages under the projection $e^{14}$ and thus moves the arm $e^{16}$, causing the shaft 6 to partially revolve and unlock the drawer. The projection $e^2$ on the arm $e'$, connected to the lever-shaft 1, contacts with a pawl $e^{19}$ on the end of a bifurcated lever $e^{20}$, pivoted to the end of the frame and connected at its opposite end by a link $e^{21}$ to an arm $e^{22}$, secured on the shaft 4. The shaft 4 also carries oppositely-projecting arms or fingers $e^{23}$, adapted to contact with each of the swinging bars $b^4$ $b^5$ and raise one or the other as the said shaft is oscillated in opposite directions. As the projection $e^2$ on the arm $e'$ contacts with the pivoted arm $e^{19}$ the bifurcated lever $e^{20}$ is moved downwardly. This oscillates the shaft 4 to cause the pivoted bar $b^4$ to be raised slightly and thus releases all the keys which may have been pressed inwardly. As soon as the projection $e^2$ passes the end of the pawl $e^{19}$ it engages with the upper fork of this bifurcated lever $e^{20}$ and moves said lever in the opposite direction, thus raising the opposite bars $b^5$ and permitting the bars $b^4$ to drop to their engaging position. The bars $b^4$ $b^5$ are retained in this position by the projection $e^2$, which enters the bifurcation in the lever $e^{20}$ so long as the lever is in its depressed position, (indicated by dotted lines in Fig. 11.)

Near one end of the shaft 6 is a projecting arm $f'$, which stands normally in proximity to a spring-actuated bell-clapper $f^2$, adapted, when drawn back and released, to contact with a gong $f^3$, secured to the frame in the rear. The arm $f'$ by the movement of the shaft 6 contacts with a pawl $f^4$, pivoted to the bell-clapper $f^2$, so that as the arm $f'$ passes in one direction it draws back and then releases the clapper $f^2$. When it passes said pawl in the opposite direction, the pawl turns on its pivot, without moving the bell-clapper, in a well-known manner.

To provide for transferring the amount of one denomination to that of a higher denomination whenever the registering-wheel of one denomination has turned a number of units to make a unit of the next higher, I provide on the rod $o^2$ a small trip-lever $g$, adapted, at each revolution of a registering-wheel, to contact with a projection $g'$ on said registering-wheel, and thus turn the trip-lever slightly on the rod $o^2$. These trip-levers $g$ are each connected by a bar $g^2$ to a cam-lever $g^3$, to which is pivoted a pawl $g^4$, which engages in the ratchet-teeth $c^{11}$ of the wheel of the next higher denomination. Adjacent to this cam-lever $g^3$ and also journaled on the rod $o^2$ is a similar lever $g^5$, which carries a finger $g^6$, formed integral therewith, which lies adjacent to the ratchet-wheel $c^{12}$. (See Fig. 6.) A pawl $g^7$, hinged on the shaft 5, engages with the ratchet-wheel $c^{11}$ to prevent the registering-wheel $c^{13}$ from turning backward. A spring $g^8$ holds the pawl $g^4$ normally in contact with the ratchet-wheel $c^{11}$. The cam-lever $g^5$ is held in its normal position by a spring $g^9$, in which position the finger $g^6$ is beyond the periphery of the ratchet-wheel $c^{12}$. As the main shaft 2 is rotated the arms $e^{10}$ and $e^{11}$ are brought successively in contact with the respective cam-levers $g^5$ and force the pawls $g^6$ inwardly, so as to engage the ratchet-teeth $c^{12}$ and stop the revolution of the ratchet-wheels. The cam-lever $g^3$ is normally out of the path of the arms $e^{10}$; but in the event that the registering-wheel of the next lower denomination shall have made a complete revolution the projection $g'$ thereon, coming in contact with the finger $g$, turns the said finger and the bar $g^2$ around the rod $o^2$, so as to carry the cam-lever $g^3$ in the path of the arm $e^{10}$, in which position it is held by the spring-pressed pawl $g^{10}$, which is located in the rod $o^2$ and adapted to engage in a conical recess $g^{11}$, formed in the bearing for the finger $g$, which encircles said rod, as shown in Fig. 7. The movement of the cam-lever $g^3$ on the rod $o^2$, as described, causes the pawl $g^4$ to move back one notch in the ratchet-wheel $c^{11}$. When the arm $e^{10}$, therefore, is moved in contact with the cam-levers $g^3$ $g^5$, the registering-wheel is caused to advance one notch, after which the stop-finger $g^6$ is forced into contact with the ratchet-wheel having the oppositely-arranged teeth and stops the same, thus preventing the overrunning of the registering-wheel in transferring.

As before stated, there is a bank of keys for each denomination and an indicating-wheel for each bank, numbered from "1" to "9," the registering-wheel for each denomination being numbered from "0" to "9." There are nine regular keys in each bank, each numbered from "1" to "9." Three such banks are shown, by which it is possible to register at one operation any sum from one to nine hundred and ninety-nine. Ordinarily in an arrangement of this kind it is necessary to press at least two keys whenever a number is registered which is represented by numerals in both the units and tens denominations. Inasmuch, however, as the registrations most generally used on a machine of this character are in multiples of five, I have provided means by which five or any multiple thereof in the units or tens series may be registered by pressing one key. I have accomplished this by placing double the number of keys in the tens series, arranged in pairs, each pair being adapted, when pressed inwardly, to form a stop for the segmental bar of that series at the same step, so that the segment of that denomination will turn the same distance with either one of said keys. All these extra or auxiliary keys are preferably arranged in the same row, which may be either the top or bottom row of keys, and are numbered with the numeral corresponding to the value of the key of that series together with the numeral "5." I further provide means by which whenever one of these auxiliary keys is pressed inwardly the "5" key of the next lower or unit series is pushed inwardly, so that by the operation of a single key a number may be indicated and registered whose digits belong to two different denominations. I further provide means by which whenever any one of these auxiliary keys is pressed inwardly all the keys in the lower denomination except the "5" key are locked, so that the auxiliary key cannot be used in making any other combination with the units of the next lower denomination except the one expressed on its face. This is accomplished as follows: Below the keyboard and hinged on the rod $o^4$ is a swinging bar $h$. This bar $h$ extends across and below all the keys of the second denomination and below the "5" key of the first or units denomination. This bar has a number of fingers $h'$ corresponding to the auxiliary keys of the second denomination and a single finger $h^2$ corresponding to the "5" key of the first denomination. Each of the keys of the second series and its auxiliary key is adapted to operate in spaces between the projections $h'$, and each auxiliary key is provided with a laterally-extending pin $h^3$, which, as said key is pressed inwardly, engages with one of the teeth or fingers $h'$. The "5" key in the lower series also has a similar pin which stands on the opposite side of said bar from the pins $h^3$, as indicated in dotted lines in Fig. 15. Whenever one of the auxiliary keys of the second denomination is pressed inwardly, it carries with it the "5" key of the first denomination, and the indication and registration will be that represented by the key depressed. This auxiliary key in the second denomination does not in any wise interfere with the regular keys of this denomination, and each of said regular keys may be used in connection with the "5" key in units denomination in the regular way if so desired, or it may be used with any of the other keys in units denomination; but the auxiliary keys cannot be used with any of the other keys for the reasons now to be explained. Under the keyboard and under each of the units and tens series of keys are pivoted oscillating bars $j$ $j'$. These two bars each have lugs $j^2$, which normally stand above the opposite ends of a pivoted vibrating lever $j^3$, so that when the lug $j^2$ of one bar is depressed it elevates the other bar. Now each of these bars has a series of teeth, the bar $j$ having teeth $j^4$ corresponding to all the auxiliary keys of its series. The bar $j'$ has teeth $j^5$ corresponding to all the keys in its series except the "5" key. These teeth in each of the bars are curved upwardly and are rounded at their upper ends and engage in recesses or cavities $j^6$ in the respective keys to which they belong, which have beveled or rounded bottoms. Whenever an auxiliary key is operated in the tens series, it depresses the bar $j$ and thus elevates the bar $j'$ and causes the teeth $j^5$ of said bar to engage all the keys of the units series except the "5" key. It also follows that if any key except the "5" key in the units series is operated it depresses the bar $j'$ and elevates the teeth $j^4$ on the bar $j$ so as to engage with all of the auxiliary keys of the tens series. These keys are therefore locked and cannot be operated except in the manner before specified.

Means are provided by which the view of the indicating-wheels is obliterated during the time the registration is being made or when the drawer is opened without operating a key. This is accomplished as follows: Hinged to the casing above the respective indicating-wheels are what I term "canceling-bars" $k$. These bars are hinged at $k'$ and connected together by a bar or link $k^2$, pivoted at $k^3$ to each of the canceling-bars and further pivoted at its end to a bell-crank lever $k^4$, journaled on a suitable bearing on the main frame. This bell-crank lever is attached by its other arm to a reciprocating bar $k^5$, which is pivoted near one end to a vibrating lever $k^6$, to which is connected a spring $k^7$, which normally tends to pull the bar $k^5$ upwardly and thus turn the arms $k$ on their pivots and conceal them in the upper part of the casing. A hook 8 is adapted to engage with a projection $k^9$ on the bar $k^5$ and hold it depressed under certain conditions. This hook $k^8$ is pivoted to a suitable point on the frame and connected by a link $k^{10}$ to a swinging bar $k^{11}$, which extends across and in contact with all the swinging plates $a^{11}$, this swinging bar $k^{11}$ being journaled on the same rod 1 with said swinging plates $a^{11}$. In proximity to the lever $k^6$ is a cam projection $k^{12}$, which is secured on the main shaft 2 and is adapted, as the shaft 2 is turned, to depress the lever $k^6$, and thus depress the canceling-bar $k$ to cause said bar to stand across the opening in front of the indicator. This canceling-bar $k$ is preferably provided with suitable words to indicate that the amount displayed behind said bar is not to be counted, the words "No sale" being shown as employed in the machine illustrated in the drawings. (See Figs. 20 and 21.)

Means are provided by which the lever $e$ is arrested against movement in either direction until it has been moved to its limit in the direction in which it has started. This is accomplished as follows: On the shaft 1, to which the lever is connected, is a double segment-gear or ratchet-wheel L, having two rows of teeth $L' L^2$. These teeth are separated by a space $L^3$, in which normally travels one of two pawls $L^4 L^5$, which project in opposite directions, the other pawl being engaged with one of the series of teeth. When either pawl is within the space $L^3$, it is retained therein by the ends of the teeth. Near the end of each series of teeth is an enlarged space $L^6$, which will permit the pawl to move laterally. The pawls $L^4 L^5$ are journaled on the frame-rod $o^4$ and are normally pressed against a hanger $L^7$ by a spring $L^8$, coiled about said rod $o^4$, the pawls $L^4 L^5$ having formed thereon an ear or lug $L^9$, the two pawls and the lug being preferably formed integral. From this ear or lug extends a rod $L^{10}$, about which is coiled a spring $L^{11}$, the rod being extended through the end of an arm $L^{12}$ on the end of a rock-shaft $L^{13}$, which extends through a suitable bearing in the hanger $L^7$ and is provided at the other end with a tappet-arm $L^{14}$, which stands in the path of a projection $L^{15}$ on the side of the double segmental ratchet-wheel L. In the normal position the pawl $L^4$ is in engagement with the ratchet-teeth $L'$, the pawl $L^5$ being in the space $L^3$. As the lever is turned downwardly the pawl $L^4$, engaging in the successive teeth, prevents the return of the lever. When the lever reaches the limit of its stroke, the projection $L^{15}$ contacts with the tappet-arm $L^{14}$, which rocks the shaft $L^{13}$ and by means of the arm $L^{12}$ and spring $L^{11}$ forces the pawls yieldingly in the direction of the other set of ratchet-teeth. The enlarged opening $L^6$ coming opposite the pawl $L^5$, this pawl is carried in line with the other series of teeth. With the pawl $L^4$ is the space $L^3$. When the lever is released and returns to its normal position, the opposite pawl engages with the opposite set of teeth and prevents it being moved in the forward direction until it has been returned to its normal position. The lever $e$ after being depressed is returned to its normal position by a spring $L^{16}$, which is connected to the double ratchets L at one end and to a suitable part on the frame at the other. (See Fig. 2.)

To provide for recording such amounts as are paid out or received on account, I place within the sides of the casing, preferably on opposite ends thereof and in proximity to the indicating devices, mechanism by means of which such amounts may be properly counted. This is accomplished in the following manner: On the frame-shaft $o'$ is journaled an arm $m$, which carries on its outer end an indicator $m'$, on the face of which is printed "Paid out," "Received on account," or similar matter. This arm $m$ is formed in the nature of a bell-crank lever, the portion $m^2$ thereof being pivotally connected to a link $m^3$, which is provided with a notch $m^4$. This link is connected at its opposite end to a vibrating U-shaped frame $m^5$, journaled on a short rod $m^6$, which also carries a series of registering or counting wheels $m^7$. The frame $m^5$ carries a series of pawls $m^8$, which engage in the ratchet-wheels $m^9$ of the counting-wheel $m^7$, a pawl $m^{10}$ being also provided for each ratchet-wheel to prevent its turning in a backward direction. These pawls $m^8$ are all connected together. The ratchet-wheels each contain ten notches and the indicating-wheels each contain ten numbers on their peripheries. Each of the ratchet-wheels of the lower denomination is provided with a notch of greater depth than the other notches, and the pawls are so arranged with reference to each other that the pawls in the wheels of the higher denomination engage with their ratchet-wheels only at such times as the pawls of the wheels of the lower denomination rest in the deep notches, so that at each vibration of the frame the wheel of the lowest denomination is turned one notch. When it makes a complete revolution, the wheel of the next denomination is turned one notch, and so on, the construction being one which is well known.

Pivoted to the arm $m^2$ is a rod $m^{11}$, adapted, when pushed inwardly, to turn the arm $m$ on the rod $o'$ and thus bring the indicator into view at the opening at the top of the casing. At the same time the notch $m^4$ is brought into the path of a projection $m^{12}$ on the shaft 3, so that when the shaft turns it engages with the shoulder $m^4$ and produces a vibration of the frame $m^5$. The construction is such that as the projection $m^{12}$ engages with the arm $m^3$ to move the frame $m^5$ it also moves the arm $m$ back to its normal position. The same arrangement is used at each side of the machine and simply serves to count the number of amounts that have been paid out or paid on account, a record being kept of such amounts on a check, which is deposited in the cash-drawer. The same form of counting device is preferably connected to the registering-wheel of the highest denomination, so as to extend the capacity thereof to any required degree.

I have heretofore referred to the fact that the indicating-wheels A' B' C' are arranged on the frame-shaft $o'$. These indicating-wheels are connected by sleeves to their pinion $c^3$, so that the units and tens wheels are brought close together, so that when used for registering dollars and cents the amounts can always appear in such a position as to be readily and easily determined.

Means are provided by which when in the normal position the registering device cannot be operated until the drawer has been closed. This I accomplish by providing a pivoted lever $n$, having a notch or shoulder $n'$, adapted when in a predetermined position to engage with a lug $n^2$ in the frame-shaft 1, so as to prevent said shaft from revolving. A notch or shoulder $n^3$ on the drawer $f$ is adapted to contact with said lever $n$ and move it so as to disengage this shoulder from said projection, so as to allow the shaft to revolve while the drawer is closed, the lever being adapted to be returned to its position by a spring, so as to reëngage said shoulder after a registration has been made by a movement of the lever $e$, and thus lock said lever against further movement until the drawer is closed. Means are provided by which this locking device may be thrown out of engagement to permit the use of the registering device without closing the drawer. This is accomplished by attaching a small link or rod $n^4$ to the end of the lever and having a pin or projection $n^5$ with which this link will engage, so as to hold the lever normally out of engagement with the projection on the shaft 1. This wire or rod will be placed within the casing and is only accessible by unlocking said casing, so that the operator has it in his power to set the machine so that it may be used either with the drawer open or in such manner that the drawer may be closed after each operation, as is desired.

In front of the indicating-wheels at the top of the casing there is provided a screen $p$, and in front of this screen is the customary glass $p'$, supported in a suitable frame $p^2$. The screen $p$ stands slightly back of the glass $p'$, but its front edge is flush with or tangent to the periphery of the indicating-wheel, suitable openings $p^3$ being provided in the screen to exhibit the numbers. By this arrangement the numbers are exhibited through the openings $p^3$ in substantially the same manner as if they were printed directly on the screen, and thus may be seen at any reasonable angle from the front of the machine, which is not the case when the screen is placed in front of the indicator, as in the usual manner. (See Figs. 27 and 28.)

The general operation of the machine, it is thought, will be understood from the foregoing description, but a brief explanation of it in the usual method of exhibiting and registering an amount is as follows: The operator first takes hold of the lever $e$, which is normally in the position shown in full lines in Fig. 2, and draws it down to its limit, as shown in dotted lines in Fig. 2. It is prevented from returning until it has reached its limit by the double ratchet-wheel L and its pawls. The downward movement of this lever produces a partial revolution of the main shaft 2, which sets the alarm and drawer-opening mechanism by the arm $e^{12}$ passing the loose portion $e^{15}$ on the lever $e^{16}$. The first movement of the shaft 2 throws the pinions $c^{14}$ of the registering mechanism out of gear and permits the transfer of the amounts from one denomination to those of a higher denomination, which is accomplished by the movement of the arms $e^{10}$ $e^{11}$, engaging successively with the cam-arms $g^3$ $g^5$, which, acting on the ratchet-wheels $c^{11}$ $c^{12}$, causes a movement of those ratchet-wheels whose pawls $g^4$ have been thrown into operative position by the engagement of the tappet $g$ by the projection $g'$ on the registering-wheel of the lower denomination. As the lever approaches the limit of its movement these pinions $c^{14}$ are again thrown into mesh with the gears $c^9$ and $c^{10}$ of each registering mechanism by the contact of the arm $c^{22}$ with the arm $c^{16}$. When the pinion is out of mesh with the gears $c^9$ $c^{10}$, it is held against revolution and in proper position to reëngage said wheels by a stationary projection $c^{30}$, which engages between the teeth of said pinion. The latter part of the downward movement of the lever $e$ has raised the plates $b^4$, so as to release any keys which had been previously operated by the projection $e^2$ contacting with the latch $e^{19}$ on the arm $e^{20}$, which is connected by the link $e^{21}$ and arm $e^{22}$ to the rock-shaft 4, which alternately raises the plates $b^4$ and $b^5$. The last movement of the lever $e$ reverses the motion of the arm $e^{20}$, so as to raise the plates $b^5$ and depress those $b^4$, thus unlocking all the keys in all the series and placing the plates $b^4$ in position to engage any keys which are operated. The keys indicating the desired amount are now operated by being pushed inwardly. The pushing in of a key in any series unlocks the segmental bar of said series through the medium of the swinging plate $a^{11}$ of said series, which moves the bell-crank $c^4$, so as to raise the shoulder $c^5$ from the projection $c^6$ on the segmental bar. The turning of the main shaft 2, however, has brought the cam-lugs $c^7$ in contact with the projection $c^8$ on each of the segmental bars, and said bars are thus held in their normal positions notwithstanding they have been released by the bell-cranks $c^4$. The inward movement of the key operates the swinging plate $k^{11}$, which, through the link $k^{10}$, disengages the hook $k^8$ from the projection $k^9$ on the bar $k^5$, connected to the canceling-bars and permits said bars to drop so as to obliterate the number which is exhibited through the openings in the screen at the top of the casing. As these canceling-bars drop the lever $k^6$ is brought into contact with the cam $k^{12}$ on the main shaft 2. As the lever $e$ is now raised it is returned to its normal position partly by the aid of gravity of the operating parts connected thereto and partly by the spring $L^{16}$. As it returns to its normal position the projection $e^2$ passes from the swinging latch $e^{19}$, thus moving the arm $e^{20}$ sufficiently only to bring both sets of the swinging plates into engagement with the keys, so as to lock all the keys in the positions which they occupy. The graduating-bars move with the shaft 2 until they contact with such keys as have been operated, thus through the medium of the intermediate gears moving the indicating-wheels correspondingly, so as to exhibit the proper number at the top of the casing. The same movement also turns the registering-wheels of each series a corresponding amount. In returning to its normal position the arm $e^{12}$ on the shaft 2 engages with a projection $e^{14}$, thus moving the lever $e^{16}$, so as to raise the bar $e^{17}$, thus releasing the drawer $f$ and through the medium of the arm $f'$ trips the bell-hammer $f^2$ and sounds an alarm. The drawer is opened by means of a spring $f^5$, which is connected to a lever $f^6$, one end of which is in contact with the drawer. The canceling-bars $k$ are held over the opening in the screen, so as to obliterate the numbers appearing there until the shaft 2 has returned to its normal position, inasmuch as the cam projection $k^{12}$ on said shaft is in contact with the arm $k^6$. As soon as the said shaft reaches its normal position, however, the arm $k^6$ will be released by said cam projection $k^{12}$ and the canceling-bars will be returned to their normal positions by the spring $k^7$, assisted, if desired, by an additional spring attached to the link $k^3$, as indicated in dotted lines in Fig. 20. The operation of the registration will thus be completed as soon as the lever has returned to its normal position, at which time the proper number will be exhibited by the indicating-wheels. The parts remain in this position until another registration is made or until the drawer is again opened, which can only occur by operating the lever $e$. The downward movement of the lever $e$ returns all the graduating-bars to their normal positions without moving the registering devices, inasmuch as the pinions $c^{14}$ will be disengaged from the registering-gears upon the first movement of said lever and prior to the time the segmental bars begin to return. The transferring mechanism will also be operated by the downward movement of the lever $e$, the transferring mechanism of each denomination being operated successively by the arrangement of the cam-arms $e^{10}$ and $e^{11}$, which are placed one slightly in advance of the other. When the drawer is opened, the lever $n$ will engage the projection on the shaft 1 and prevent its operation until the drawer has been closed, unless said lever is rendered inoperative by hooking the link $n^4$ over the projection $n^5$. (See Fig. 26.)

It will be seen from the above description that the registration takes place as the lever returns to its normal position, while the transferring of amounts from one denomination to another occurs as the lever is drawn down to begin another operation. The accuracy of the registration is therefore assured. If the amount registered should be a multiple of five not exceeding one hundred, it will be accomplished by the operation of a single key by the use of the auxiliary keys in the second denomination, which will cause the "5" key in the first denomination to be operated therewith and lock all the other keys in the manner above described.

Having thus described my invention, I claim—

1. In a cash-register, a series of keys all arranged in the same plane, graduating-bars having steps adapted to contact with the different keys of a series, two sets of notches in each of said keys and two vibrating plates adapted to engage in said notches, a rock-shaft on which said vibrating plates are journaled, and means as described for rocking said shaft so as to alternately raise said plates and thus successively lock said keys against movement in opposite directions, substantially as specified.

2. In a cash-register, a series of keys, a graduating-bar having steps to engage with said keys, a segmental gear connected to said graduating-bar, separate gears meshing with said segmental gear, one of said gears being connected to an indicating-wheel, and the other being arranged adjacent to but separate from a registering-wheel, and a movable pinion adapted to mesh with said registering-gear and its adjacent gear to cause said registering-wheel to move with said graduating-bar or be disengaged therefrom, substantially as specified.

3. In a cash-register, keys arranged in series, a segmental bar for each series of keys each having steps corresponding to the different keys, auxiliary keys, one for each key in the second denomination, and a connection from each auxiliary key to one of the keys of the next lower denomination, means connected with each of said keys for releasing the graduating-bars of its series whereby the pressing of an auxiliary key will disengage the segmental bar of both denominations, substantially as specified.

4. In a cash-register, keys arranged in series, one series for each denomination, auxiliary keys in one denomination, and a connection from each auxiliary key to a single key in a different denomination, a locking device also connected to each auxiliary key adapted by the movement of said key to lock all the keys in the other denomination except the key with which said auxiliary key is connected, substantially as specified.

5. In a cash-register, keys arranged in series, each series representing a different denomination, an auxiliary key for each key in the second denomination, a swinging plate under the keys of said second denomination having a tooth for each auxiliary key and engaged therewith, said plate being extended under the keys of the other denomination and having a single tooth adapted to engage a single key in said other denomination, locking-bars under each of said denominations, and a vibrating lever connecting said locking-bars, projections on said locking-bars normally in contact with the auxiliary keys of the second denomination, and with all the keys, save one, in the first denomination, and means, as described, whereby when any key in engagement with either of said locking-bars is operated, all the other keys engaged with said locking-bar of a different denomination are locked, substantially as specified.

6. In a cash-register having keys arranged in series, one series for each denomination and adapted to represent units, tens, hundreds, registering mechanism adapted when released to contact with the respective keys, and indicating-wheels connected with said registering mechanism and adapted to indicate the amounts registered by said registering mechanism, an auxiliary key for each key in the second denomination, said auxiliary key being adapted to release the registering mechanism of its denomination and cause it to move to the same extent as its companion key belonging to said denomination, a connection from each of said auxiliary keys to the "5" key in the next lower denomination whereby whenever an auxiliary key of the second denomination is operated the "5" key of the next lower denomination is also operated, and means, as described, for operating the registering mechanism connected to said keys, substantially as specified.

7. In a cash-register, normally-locked keys arranged in series, one series for each denomination, normally-locked graduating-bars, one for each series of keys and adapted to contact with said keys and each having steps to contact with the different keys of its series, an auxiliary key for each key in one denomination, and a connection from each auxiliary key to one of the keys of the next lower denomination, means connected with each series of keys for unlocking the segmental bar belonging to said series, and a lever to unlock said keys, substantially as specified.

8. In a cash-register, a series of keys, a segmental bar for each series of keys having steps to contact with the different keys of the series, an operating-lever adapted to return all of said segmental bars to their normal positions when said lever is depressed, locking devices to lock said keys against movement in either direction, and means connected with said lever for alternately operating said locking devices so as to successively unlock said keys to permit their movement in opposite directions, a drawer-lock also connected to said operating-lever in such a manner that the drawer is unlocked as the lever returns to its normal position, substantially as specified.

9. In a cash-register, a series of keys normally locked against movement in either direction, an operating-lever adapted when moved in one direction to successively unlock said keys to permit their movement in opposite directions, a normally-locked cash-drawer, and mechanism connected with said operating-lever to unlock said drawer as said lever returns to its normal position, and registering mechanism also operated by said lever to register the amount indicated by said keys when said lever is operated, substantially as specified.

10. In a cash-register, keys arranged in series, segmental bars, one for each series, having steps to correspond with the respective keys, indicating-wheels geared positively to said segmental bars so as to always indicate the position thereof, means connected with each key for disengaging the graduating-bar corresponding to said series, an operating-lever to return said segmental bars to their normal positions after the same have been released, and means connected with said lever for unlocking the drawer and the keys, substantially as specified.

11. In a cash-register, a normally-locked graduating-bar having steps as described, keys arranged in series to contact with the respective steps of said bar when the same is released, means connected with each key for unlocking said bar, a gear-segment on said bar, and a gear in mesh therewith, a registering-gear adjacent to said segmental gear, an indicating-wheel also geared positively to said segment, a pinion normally meshing with said registering-gear and its adjacent gear, a locking device for said keys, and an operating-lever to unlock said keys, and means connected with said lever to release said segmental bars when the lever is returned to its normal position, substantially as specified.

12. In a cash-register, keys arranged in series, and a graduated bar for each series, a gear-segment connected to each graduated bar, and an indicating-wheel geared to said gear-segment, a gear also meshing with said segment, and a registering-gear adjacent thereto, a pinion normally meshing with said registering-gear and its adjacent gear, transferring mechanism for transferring amounts from one registering-wheel to another, an operating-lever and means connected therewith adapted when moved in one direction to unlock said keys, disengage said pinion and move said graduated bars to their normal positions and operate said transferring mechanism, and when said lever is returned to its normal position to disengage said segmental bars to permit them to operate said registering-gear, substantially as specified.

13. In a cash-register, a normally-closed cash-drawer, a normally-inactive registering mechanism, and a series of normally-locked keys, each adapted when operated to release said registering mechanism, an operating-lever and means connected therewith adapted when moved in one direction to unlock said keys and engage said registering mechanism, and when moved in the opposite direction, to lock said keys and disengage said registering mechanism and unlock said drawer, substantially as specified.

14. The combination, in a cash-register, of a normally-locked cash-drawer, and a series of normally-locked keys, registering mechanism adapted to be released by said keys, an operating-lever and means connected therewith adapted when moved in one direction to unlock said keys and retain said registering mechanism, and when moved in the opposite direction, to lock said keys, unlock said drawer and disengage said registering mechanism, a lever-locking device operated by said drawer to lock said lever when the drawer is open, substantially as specified.

15. The combination with the operating-lever, of the double-ratchet segment connected thereto, oppositely-arranged pawls adapted to successively engage with said ratchets, an intermediate space between said ratchets in which one of said pawls travels while the other is engaged with its ratchet-wheel, a projection on said ratchet-wheel, a rock-shaft having an arm to engage with said projection, and a connection from said rock-shaft to said pawl whereby, when the segment is moved to a predetermined position, the position of said pawls is shifted, substantially as specified.

16. In a cash-register, the combination with the keys and the registering mechanism released thereby, an operating-lever for controlling said registering mechanism, and a counting mechanism independent of said registering mechanism, a special key for moving said counting mechanism into operative position, and an indicator to indicate the position of said counting mechanism, and means connected with said lever to operate said counting mechanism when in its operative position and at the same time to return said counting mechanism and its indicator to a normally-inoperative position, substantially as specified.

17. In a cash-register, a series of keys, and indicating-wheels, one for each series of keys, means for operating said indicating-wheels to indicate the amount of any one of said keys, a chamber in front of said indicating-wheels, and a screen at the back of said chamber, openings for said indicating-wheels in said screen, said screen being placed with its front edge tangent to or flush with the periphery of said indicating-wheels, substantially as specified.

18. The combination with a series of keys, and an indicating-wheel having numbers corresponding to each key of the series, intermediate mechanism for operating said indicating-wheel to cause it to move so as to display the number corresponding to the key operated, a canceling device adjacent to said indicating-wheel and adapted to be released and moved to a position in front of said indicating-wheel when a key is operated, a shaft connected with said intermediate mechanism having a cam adapted to lock said canceling device in its exposed position during the movement of said operating device, and means, as described, for unlocking said canceling device and returning it to its normal position when said operating device has completed its movement, substantially as specified.

19. The combination with the keys and the indicating-wheels, a main shaft having graduated bars thereon, and an operating-lever connected by intermediate mechanism to said main shaft and to said graduated bars, hinged canceling-bars arranged adjacent to said indicating-wheels and normally above the same, a retaining device for retaining said graduated bars in their normal position, a connection from each of said keys to said retaining device to release said canceling-bars when a key is operated, a cam on said main shaft adapted to contact with a lever connected to said canceling-bar and lock said canceling-bar in its exposed position during the movement of said shaft, and means for returning said canceling-bars to their normal positions when said shaft has completed its movement, substantially as specified.

20. The combination with a canceling-bar, and an indicating-wheel, a retaining device for retaining said canceling-bar, and key-operated mechanism for releasing said retaining device, an operating-lever, and a shaft connected thereto, a cam on said shaft to engage and retain said canceling-bar until said shaft has completed its movement, substantially as specified.

21. In a cash-register, a normally-inoperative register mechanism, and a series of keys to release the same, intermediate actuating devices to cause said registering mechanism to move to the distance determined by said keys so as to register the amount corresponding to each key, a transferring mechanism consisting of a pawl and ratchet-wheel, and a stop-pawl adjacent to said transferring mechanism, said transferring mechanism and stop-pawls being each provided with cam-shaped arms successively operated by the movement of said intermediate actuating mechanism to move said registering device and stop the same, substantially as specified.

22. The combination with a main shaft, graduated bars thereon, segmental gears connected to said graduated bars, and keys for limiting the movement of said graduated bars, a gear meshing with said segment, and a registering-gear adjacent to said segmental gear, a movable pinion adapted when in one position to mesh with said gears and cause them to revolve together, a spring-actuated lever to hold said pinion in mesh with said gears, and cam projections on said main shaft to cause said pinion to disengage and reëngage said gears at different portions of the revolution of said shaft, substantially as specified.

23. In a cash-register, cash-keys arranged in a common plane, two sets of notches in each set of keys, and two vibrating plates to engage in said notches, a rock-shaft on which said vibrating plates are journaled, and means as described for rocking said shaft so as to successively raise and lower said plates, substantially as specified.

24. In a cash-register, a series of normally-locked keys, an operating-lever having means connected therewith to unlock said keys when the lever is moved in one direction, a normally-locked cash-drawer, and mechanism connected with said operating-lever to unlock said drawer as said lever returns to its normal position, and registering mechanism released by said lever to register the amount indicated by said keys, substantially as specified.

In testimony whereof I have hereunto set my hand this 19th day of February, A. D. 1895.

JOHN PFEIFER.

Witnesses:
G. M. GRIDLEY,
CHAS. I. WELCH.